(12) United States Patent
Jenkins

(10) Patent No.: US 9,108,480 B2
(45) Date of Patent: Aug. 18, 2015

(54) MODULAR SUSPENSION SYSTEM

(71) Applicant: Ronald D. Jenkins, Campbell, CA (US)

(72) Inventor: Ronald D. Jenkins, Campbell, CA (US)

(*) Notice: Subject to any disclaimer, the term of this patent is extended or adjusted under 35 U.S.C. 154(b) by 0 days.

(21) Appl. No.: 14/306,059

(22) Filed: Jun. 16, 2014

(65) Prior Publication Data
US 2014/0375006 A1    Dec. 25, 2014

Related U.S. Application Data

(60) Provisional application No. 61/836,965, filed on Jun. 19, 2013.

(51) Int. Cl.
| | |
|---|---|
| *B60G 3/00* | (2006.01) |
| *F16D 55/22* | (2006.01) |
| *F16D 65/12* | (2006.01) |
| *B60G 7/00* | (2006.01) |
| *B60G 3/20* | (2006.01) |

(52) U.S. Cl.
CPC .. *B60G 3/00* (2013.01); *B60G 3/20* (2013.01); *B60G 7/001* (2013.01); *F16D 55/22* (2013.01); *F16D 65/128* (2013.01); *B60G 2202/135* (2013.01); *B60G 2204/61* (2013.01); *B60G 2206/01* (2013.01); *B60G 2206/99* (2013.01)

(58) Field of Classification Search
CPC .............. B60G 7/001; B60G 2204/61; B60G 2206/01; B60G 2206/99; B60G 2202/135; B60G 3/20

USPC .................................... 280/124.134, 124.135
See application file for complete search history.

(56) References Cited

U.S. PATENT DOCUMENTS

| | | | | |
|---|---|---|---|---|
| 8,925,941 | B2* | 1/2015 | Cordier et al. | 280/124.109 |
| 2006/0071441 | A1* | 4/2006 | Mathis | 280/124.128 |
| 2007/0235972 | A1* | 10/2007 | Schmitz | 280/124.156 |
| 2009/0230650 | A1* | 9/2009 | Mayen et al. | 280/124.1 |

* cited by examiner

*Primary Examiner* — Faye M Fleming
(74) *Attorney, Agent, or Firm* — Kali Law Group, P.C.

(57) ABSTRACT

Modular suspension systems for customizing a stock automobile are presented including in any combination: a pair of asymmetrical control arm components having a control arm connection geometry sized to replace a pair of stock control arm components, where the pair of asymmetrical control arm components include at least additional control arm customization, and where the pair of asymmetrical control arm components are compatible with all other stock components of the stock automobile without modification of the stock components; a pair of spindle components having a spindle connection geometry sized to replace a pair of stock spindle components, where the pair of spindle components include at least additional spindle customization, and where the pair of spindle components are compatible with all other stock components of the stock automobile without modification of the stock components.

20 Claims, 4 Drawing Sheets

MODULAR SUSPENSION SYSTEM

FIELD OF INVENTION

Embodiments of the present invention relate to automotive suspension systems.

BACKGROUND

From the onset of the automobile age, hobbyists and mechanics have sought to personalize their vehicles. Traditionally, automotive manufacturers warehoused parts for repairing currently supported product lines. As product lines became obsolete, aftermarket industries arose to meet the demands of on-the-road and collector's vehicles. In addition, highly modified vehicles became popular as speed and handling became more important to owners.

Conventional aftermarket modifications were, of necessity, highly specific to a particular product line. For example, some multiply dependent components such as suspension components were not readily available since the cost of development to assure compatibility remained high. In some examples, extension modification to stock parts was required to the extent that returning to an original configuration was difficult or impossible. As such, highly modified vehicles became "one-off" and "one-way" propositions. In addition, because the costs for such modifications were high and could not be amortized over a period of time, these types of modifications remained out of reach of the average hobbyist. As such, modular suspension systems are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, modular suspension systems for customizing a stock automobile are presented including in any combination: a pair of asymmetrical control arm components having a control arm connection geometry sized to replace a pair of stock control arm components, where the pair of asymmetrical control arm components include at least additional control arm customization, and where the pair of asymmetrical control arm components are compatible with all other stock components of the stock automobile without modification of the stock components; a pair of spindle components having a spindle connection geometry sized to replace a pair of stock spindle components, where the pair of spindle components include at least additional spindle customization, and where the pair of spindle components are compatible with all other stock components of the stock automobile without modification of the stock components; a pair of coil-over shock components having a shock connection geometry sized to replace a pair of stock shock components, where the pair of coil-over shock components include at least additional shock customization, and where the pair of coil-over shock components are compatible with all other stock components of the stock automobile without modification of the stock components. In some embodiments, systems further include: a pair of disc brake components having a disc brake geometry sized to replace a pair of stock brake components, where the pair of disc brake components include at least additional disc brake customization, and where the pair of disc brake components are compatible with all other stock components of the stock automobile without modification of the stock components. In some embodiments, systems further include: a pair of forward strut components having a forward strut geometry sized to be compatible with all other stock components, where the pair of forward strut components include at least additional forward strut customization; and a sway bar component having a sway bar geometry sized to be compatible with all other stock components, where the sway bar component include at least additional sway bar customization.

In some embodiments, systems, the at least the additional control arm customization includes: an increased range of adjustability over the pair of stock control arm components; and an increased range of caster and camber alterations over the pair of stock control arm components. In some embodiments, the at least the additional spindle customization includes: a lowering of the stock automobile's center of gravity thereby improving aerodynamic characteristics, fuel economy, and handling over the pair of stock spindle components; and a rotation of a brake caliper mount thereby allowing larger calipers over the pair of stock spindle components. In some embodiments, the pair of spindle components further include: a pair of lower spindle ball joint adapters that allow a relocation of a lower control arm ball joint pivot point. In some embodiments, the pair of coil-over shock components each further include an adapter for matching placement of the pair of coil-over shock components with the pair of stock shock components. In some embodiments, the at least the additional shock customization includes: a removal of a stock torsion bar suspension thereby increasing an engine compartment space over the pair of stock shock components; and an external adjustment of damping characteristic of the pair of coil-over shock components. In some embodiments, the at least additional disc brake customization includes: an increased brake rotor diameter over the pair of stock brake components; and an increased cooling effect achieved by one of, drilling, slotting, and venting each brake rotor of the pair of disc brake components. In some embodiments, the at least additional forward strut customization includes: a resistance to torsional twist and distortion created by an engine torque over stock components. In some embodiments, the at least additional sway bar customization includes: a reduction in body roll thereby maintaining an established suspension geometry during corning.

In other embodiments, modular suspension kits for customizing a stock automobile are presented including: as pair of asymmetrical control arm components having a control arm connection geometry sized to replace a pair of stock control arm components, where the pair of asymmetrical control arm components include at least additional control arm customization, and where the pair of asymmetrical control arm components are compatible with all other stock components of the stock automobile without modification of the stock components; a pair of spindle components having a spindle connection geometry sized to replace a pair of stock spindle components, where the pair of spindle components include at least additional spindle customization, and where the pair of spindle components are compatible with all other stock components of the stock automobile without modification of the stock components; a pair of coil-over shock components having a shock connection geometry sized to replace a pair of stock shock components, where the pair of coil-over shock components include at least additional shock customization, and where the pair of coil-over shock components are compatible with all other stock components of the stock automobile without modification of the stock components. In some embodiments, kits further include: a pair of disc brake components having a disc brake geometry sized to replace a pair of stock brake components, where the pair of disc brake components include at least additional disc brake customization, and where the pair of disc brake components are compatible with all other stock components of the stock automobile without modification of the stock components. In some embodiments, kits further include: a pair of forward strut components having a forward strut geometry sized to be compatible with all other stock components, where the pair of forward strut components include at least additional forward strut customization; and a sway bar component having a sway bar geometry sized to be compatible with all other stock components, where the sway bar component include at least additional sway bar customization.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
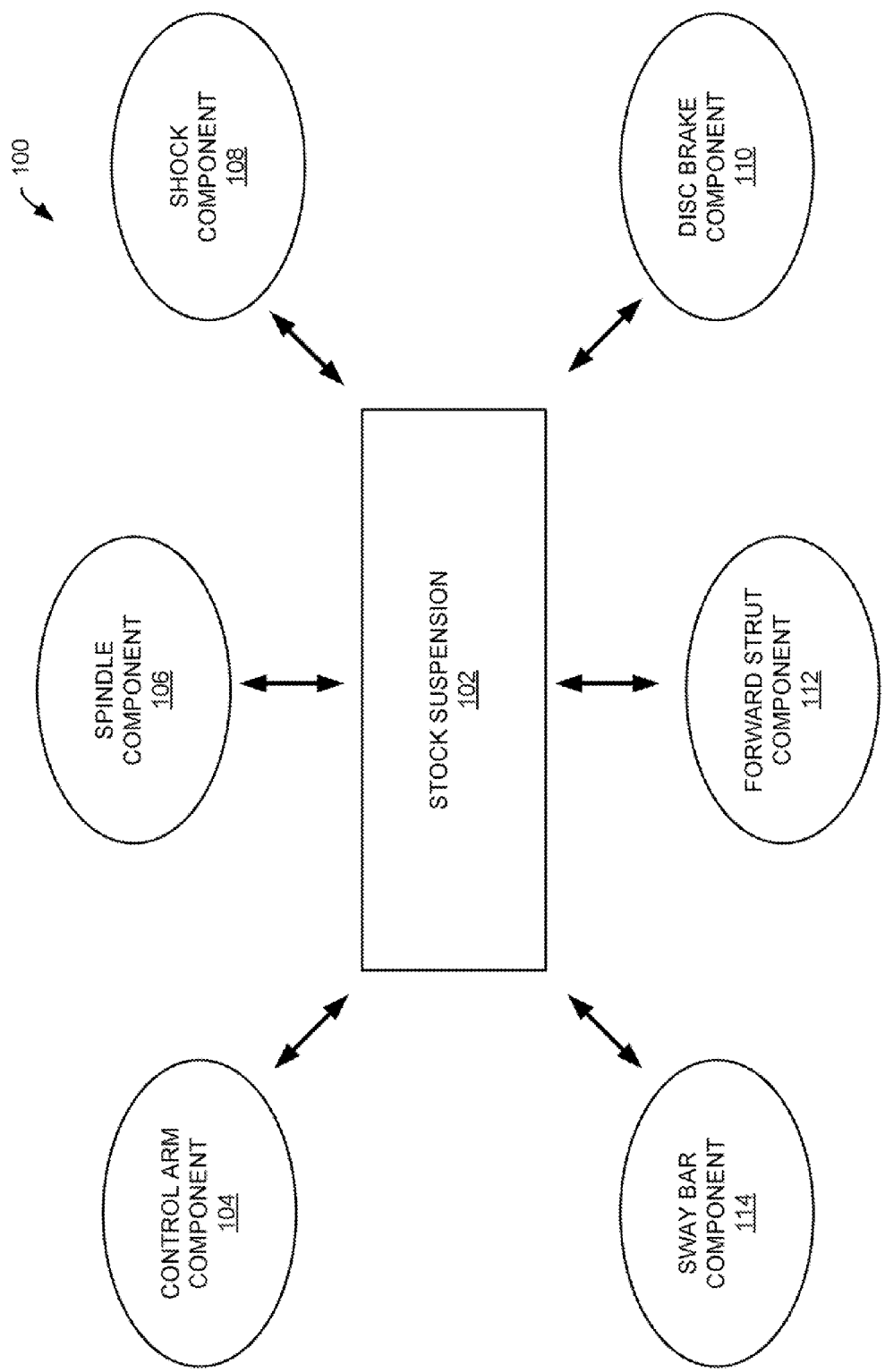
FIG. 1 is an illustrative representation of a modular suspension system in accordance with embodiments of the present invention.

FIG. 1 is an illustrative representation of a modular suspension system in accordance with embodiments of the present invention. As noted above, modifying a stock vehicle may require high costs and irreparable modifications. Nowhere are these issues more prevalent than in suspension modification. One reason contributing to the difficulty of modifying suspension is that the geometry of the interlinked parts must either be maintained or modified in such as way as to equal or improve stock configurations. For example, a stock control arm typically has a fixed geometry designed to operate within a specific range of use. For this reason adjustments to the geometry to accommodate a different range of use, such as racing, is limited or impossible. In addition, any changes to a stock control arm must account for all other geometry in the suspension system for the change to be effective and safe. Systems provided herein attempt to allow a user to modify their stock suspension in a way that is safe, effective, and cost sensitive. In order to accomplish this, systems must provide improvements over stock components and be forwardly and backwardly interchangeable with stock components.

For example, as illustrated, stock suspension 102 may be modified with any of the following components: control arm component 104, spindle component 106, shock component 108, disc brake component 110, forward strut component 112, and sway bar component 114. Where systems presented differ significantly from conventional solutions is that any of the components may be changed in any order from stock to custom and from custom to stock. For example, a user may choose control arm component 104 to modify stock suspension 102. In utilizing control arm component 104, the user may simply replace the stock components with the new components without any other modification to any other stock component. If the improvements are acceptable, the user may then select any other component (or none) for the future. If the improvements are not acceptable, the user may then simply replace the modified component with the stock component to return the stock suspension to its original configuration. In this manner, the user may selectively change components as needed or as may be afforded. Furthermore, each modification may add additional customization such as adjustability, improved geometry, and increased performance. Still further, combinations of modifications may be utilized at will since the parts are interchangeable with stock parts and require no other modifications to stock components. Thus, for example, a user may utilize spindle component 106 alone or in combination with any of the other components.

Figure 2:
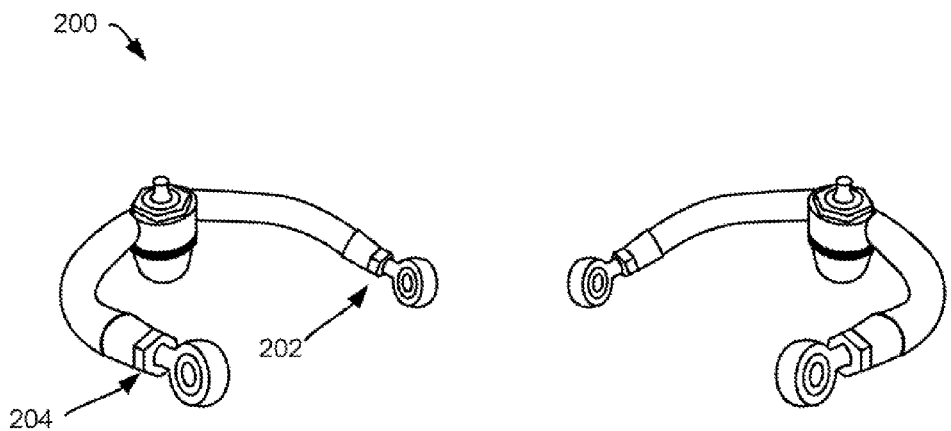
FIG. 2 is an illustrative representation of a pair of asymmetrical control arm components in accordance with embodiments of the present invention.

FIG. 2 is an illustrative representation of a pair of asymmetrical control arm components 200 in accordance with embodiments of the present invention. As contemplated herein, a pair of asymmetrical control arm components may include a control arm connection geometry sized to replace a pair of stock control arm components. Importantly and as noted above, the pair of asymmetrical control arm components may be compatible with all other stock components of the stock automobile without modification of the stock components. In addition, the pair of asymmetrical control arm components may include additional control arm customization. For example, embodiments may provide an increased range of adjustability over the pair of stock control arm components resulting in an increased range of caster and camber alterations over the pair of stock control arm components. This adjustability may provide improved handling characteristics such as increased high speed stability through additional positive caster which may be unattainable when using the stock upper control arms. In embodiments, adjustment point 202 and 204 may be utilized to accomplish this customization.

Figure 3:
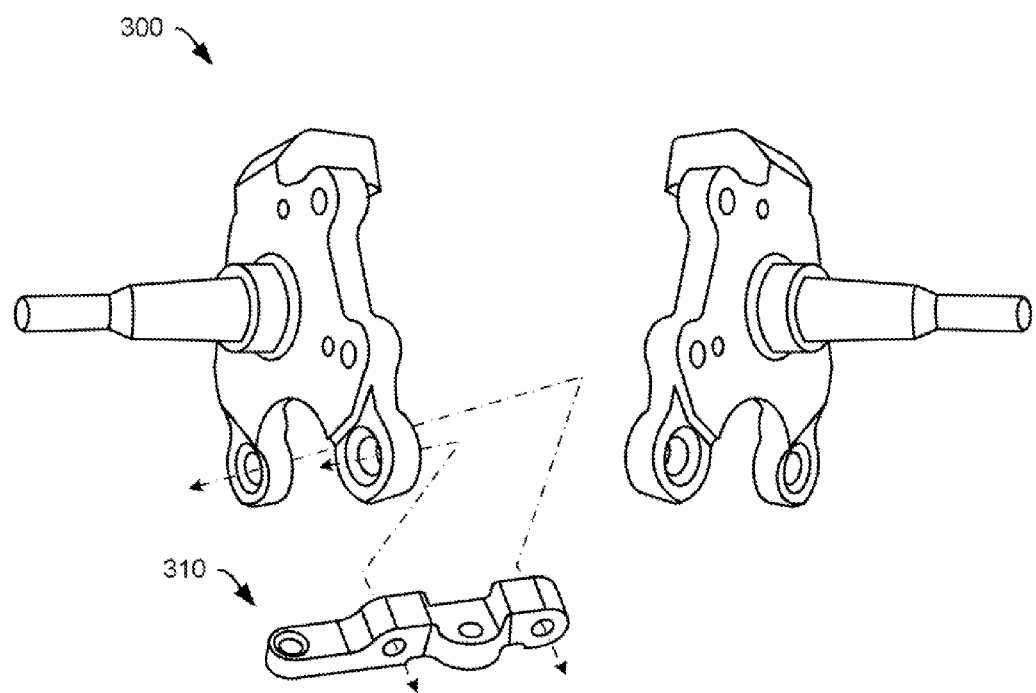
FIG. 3 is an illustrative representation of a pair of spindle components in accordance with embodiments of the present invention.

FIG. 3 is an illustrative representation of a pair of spindle components 300 in accordance with embodiments of the present invention. As contemplated herein, a pair of spindle components may include a spindle connection geometry sized to replace a pair of stock spindle components. Importantly and as noted above, the pair of spindle components may be compatible with all other stock components of the stock automobile without modification of the stock components. In addition, the pair of spindle components include additional spindle customization. For example, embodiments may provide a lowering of the stock automobile's center of gravity thereby improving aerodynamic characteristics, fuel economy, and handling over the pair of stock spindle components; and a rotation of a brake caliper mount thereby allowing larger calipers over the pair of stock spindle components. In some embodiments, spindle components may further include a pair of lower spindle ball joint adapters that allow a relocation of a lower control arm ball joint pivot point. The utilization of lower spindle ball joint adapters allow the relocation of the lower control arm ball joint pivot point, providing the opportunity to alter the inner lower control arm pivot to finally arrive at a point where full advantage is taken of the progressive implementation of the aforementioned components resulting in reduced side scrub, camber change throughout suspension travel, increased positive caster fur high speed stability, and reduced bump steer. The vehicle is ultimately more stable under all conditions, handles better, and has a more pleasant ride quality. In some embodiments, lower spindle ball joint adapter 310 may be utilized to move the captive stock ball joint away from being bolted to the spindle and allows the ball joint to be captive in the control arm instead. Relocation provides a pivot point lower by about 2" which only then allows the alteration of the lower arm pivot points.

Figure 4:
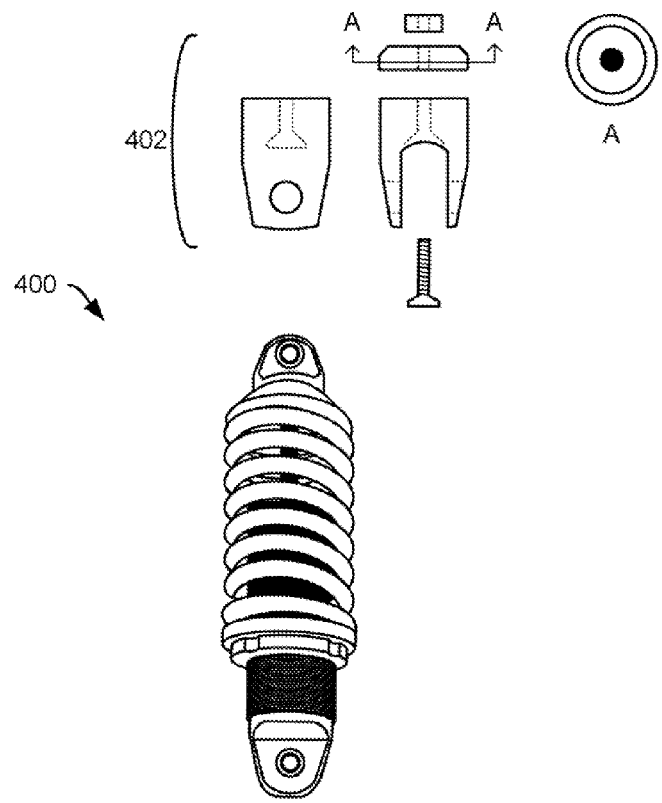
FIG. 4 is an illustrative representation of a coil-over shock component in accordance with embodiments of the present invention.

FIG. 4 is an illustrative representation of a coil-over shock component 400 in accordance with embodiments of the present invention. As contemplated herein, a pair of coil-over shock components may include a shock connection geometry sized to replace a pair of stock shock components. Importantly and as noted above, the pair of coil-over shock components may be compatible with all other stock components of the stock automobile without modification of the stock components. In addition, the pair of coil-over shock components may include additional shock customization. For example, embodiments may provide removal of a stock torsion bar suspension thereby increasing an engine compartment space over the pair of stock shock components; and an external adjustment of damping characteristic of the pair of coil-over shock components. In some embodiments, increasing engine compartment space may allow for use of larger headers. In addition, as illustrated, adapter 402 may be provided for matching placement of the pair of coil-over shock components with the pair of stock shock components. As may be appreciated, adapters allow for both stock mounting and custom mounting of some components. Thus, in embodiments, a user may initially use a stock mounting configuration, but with further modification, later use a modified mounting configuration.

Figure 5:
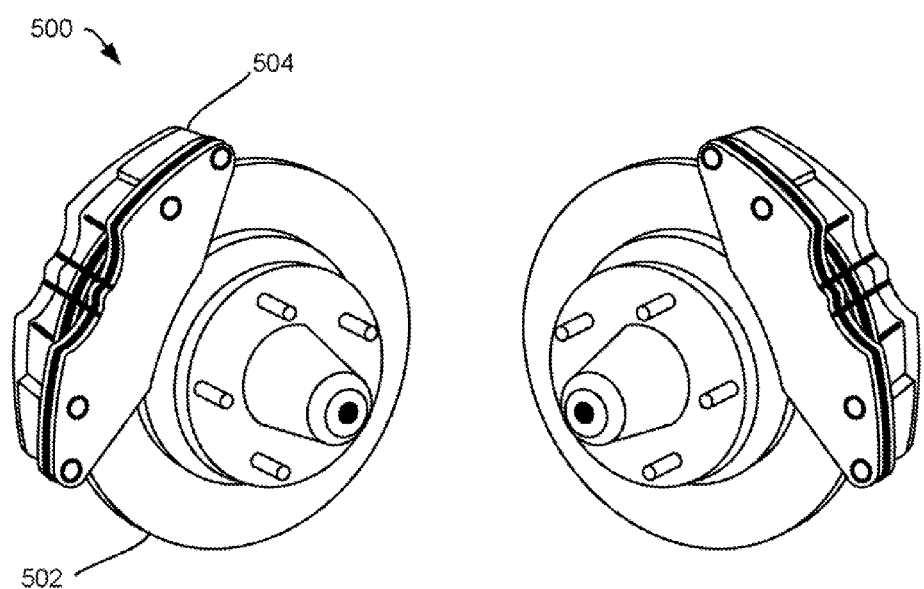
FIG. 5 is an illustrative representation of a pair of disc brake components in accordance with embodiments of the present invention.

FIG. 5 is an illustrative representation of a pair of disc brake components 500 in accordance with embodiments of the present invention. In embodiments, disc brake component 500 may include rotor 502 and caliper 504. As contemplated herein, a pair of disc brake components may include a disc brake geometry sized to replace a pair of stock brake components. Importantly and as noted above, the pair of disc brake components may be compatible with all other stock components of the stock automobile without modification of the stock components. In addition, the pair of disc brake components may include additional disc brake customization. For example, embodiments may provide an increased brake rotor diameter over the pair of stock brake components; and an increased cooling effect achieved by one of, drilling, slotting, and venting a brake rotor of the pair of disc brake components. It may be appreciated that larger caliper pistons or increased number of pistons puts more torque on the rotor over a larger surface area, stopping the vehicle more quickly. Use of modem materials in the calipers allows more rapid cooling and improvements in caliper design reduces caliper distortion, also increasing efficiency.

Figure 6:
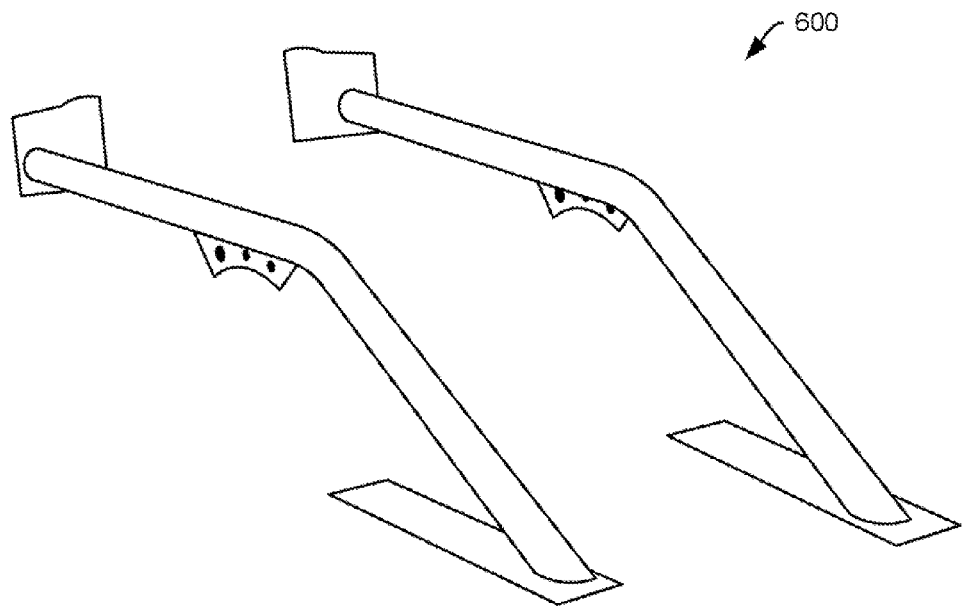
FIG. 6 is an illustrative representation of a pair of forward strut components in accordance with embodiments of the present invention.

FIG. 6 is an illustrative representation of a pair of forward strut components 600 in accordance with embodiments of the present invention. As contemplated herein, a pair of forward strut components may include a forward strut geometry sized to be compatible with all other stock components. Importantly and as noted above, the pair of a forward strut components may be compatible with all other stock components of the stock automobile without modification of the stock components. In addition, the pair of forward strut components may include additional forward strut customization. For example, embodiments may provide a resistance to torsional twist and distortion created by an engine torque over stock components. It may be appreciated that large resistance to torsional twist and distortion created by the engine's torque being applied to the front frame rails, may result in more torque being applied to the ground rather than spent in distorting the chassis. The lift of the engine on the driver's side and the downward push on the passenger's side becomes accordingly more controllable with forward strut component embodiments. One beneficial byproduct of the additional rigidity is a reduction in bending and fracturing of the inner sheet metal fender structures.

Figure 7:
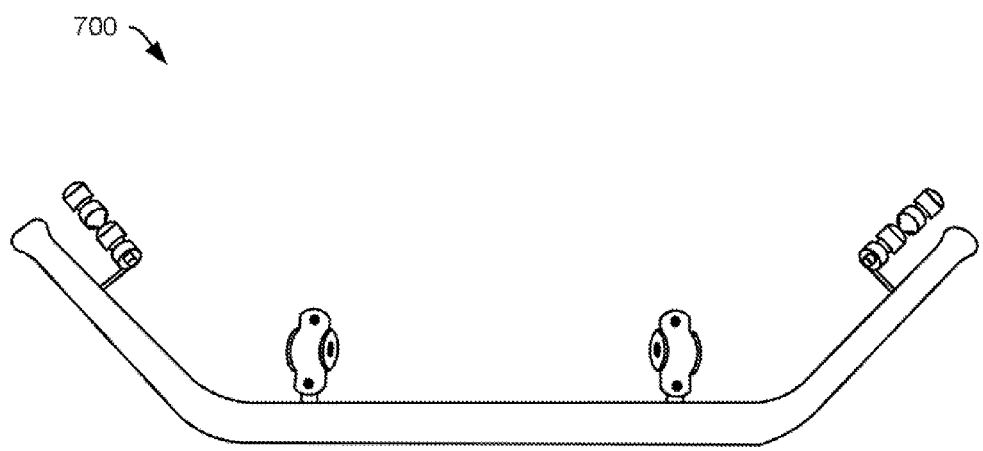
FIG. 7 is an illustrative representation of sway bar component in accordance with embodiments of the present invention.

FIG. 7 is an illustrative representation of sway bar component 700 in accordance with embodiments of the present invention. As contemplated herein, a sway bar component may include a sway bar geometry sized to be compatible with all other stock components. Importantly and as noted above, the sway bar component may be compatible with all other stock components of the stock automobile without modification of the stock components. In addition, the sway bar component may include additional sway bar customization. For example, embodiments may provide a reduction in body roll thereby maintaining an ideal (or established) suspension geometry during corning resulting in better traction and associated predictability in handling.

Other Customization

In some embodiments, a rack and pinion steering assembly may replace a stock steering box. This replacement makes for a much more modern and compact method of steering on the car. In addition, a rack and pinion steering assembly embodiment is lighter and may be mounted forward of the front axle centerline to increase oil pan and header clearance. As may be appreciated a larger oil pan provides an increased oil capacity without mandating that the pan hang below the main k-frame to do so. Rack and pinion steering assembly embodiments may be a manual self-contained unit or paired with a power steering pump.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A modular suspension system for customizing a stock automobile comprising in any combination:

a pair of asymmetrical control arm components having a control arm connection geometry sized to replace a pair of stock control arm components, wherein the pair of asymmetrical control arm components include at least additional control arm customization, and wherein the pair of asymmetrical control arm components are compatible with all other stock components of the stock automobile without modification of the stock components;

a pair of spindle components having a spindle connection geometry sized to replace a pair of stock spindle components, wherein the pair of spindle components include at least additional spindle customization, and wherein the pair of spindle components are compatible with all other stock components of the stock automobile without modification of the stock components;

a pair of coil-over shock components having a shock connection geometry sized to replace a pair of stock shock components, wherein the pair of coil-over shock components include at least additional shock customization, and wherein the pair of coil-over shock components are compatible with all other stock components of the stock automobile without modification of the stock components.

2. The system of claim 1, further comprising:
a pair of disc brake components having a disc brake geometry sized to replace a pair of stock brake components, wherein the pair of disc brake components include at least additional disc brake customization, and wherein the pair of disc brake components are compatible with all other stock components of the stock automobile without modification of the stock components.

3. The system of claim 1, further comprising:
a pair of forward strut components having a forward strut geometry sized to be compatible with all other stock components, wherein the pair of forward strut components include at least additional forward strut customization; and
a sway bar component having a sway bar geometry sized to be compatible with all other stock components, wherein the sway bar component include at least additional sway bar customization.

4. The system of claim 1, wherein the at least the additional control arm customization comprises:
an increased range of adjustability over the pair of stock control arm components; and
an increased range of caster and camber alterations over the pair of stock control arm components.

5. The system of claim 1, wherein the at least the additional spindle customization comprises:
a lowering of the stock automobile's center of gravity thereby improving aerodynamic characteristics, fuel economy, and handling over the pair of stock spindle components; and
a rotation of a brake caliper mount thereby allowing larger calipers over the pair of stock spindle components.

6. The system of claim 1, wherein the pair of spindle components further comprise:
a pair of lower spindle ball joint adapters that allow a relocation of a lower control arm ball joint pivot point.

7. The system of claim 1, wherein the pair of coil-over shock components each further include an adapter for matching placement of the pair of coil-over shock components with the pair of stock shock components.

8. The system of claim 7, wherein the at least the additional shock customization comprises:

a removal of a stock torsion bar suspension thereby increasing an engine compartment space over the pair of stock shock components; and
an external adjustment of damping characteristic of the pair of coil-over shock components.

9. The system of claim 2, wherein the at least additional disc brake customization comprises:
an increased brake rotor diameter over the pair of stock brake components; and
an increased cooling effect achieved by one of, drilling, slotting, and venting each brake rotor of the pair of disc brake components.

10. The system of claim 3, wherein the at least additional forward strut customization comprises:
a resistance to torsional twist and distortion created by an engine torque over stock components.

11. The system of claim 3, wherein the at least additional sway bar customization comprises:
a reduction in body roll thereby maintaining an established suspension geometry during corning.

12. A modular suspension kit for customizing a stock automobile comprising:
a pair of asymmetrical control arm components having a control arm connection geometry sized to replace a pair of stock control arm components, wherein the pair of asymmetrical control arm components include at least additional control arm customization, and wherein the pair of asymmetrical control arm components are compatible with all other stock components of the stock automobile without modification of the stock components;
a pair of spindle components having a spindle connection geometry sized to replace a pair of stock spindle components, wherein the pair of spindle components include at least additional spindle customization, and wherein the pair of spindle components are compatible with all other stock components of the stock automobile without modification of the stock components;
a pair of coil-over shock components having a shock connection geometry sized to replace a pair of stock shock components, wherein the pair of coil-over shock components include at least additional shock customization, and wherein the pair of coil-over shock components are compatible with all other stock components of the stock automobile without modification of the stock components.

13. The kit of claim 12, further comprising:
a pair of disc brake components having a disc brake geometry sized to replace a pair of stock brake components, wherein the pair of disc brake components include at least additional disc brake customization, and wherein the pair of disc brake components are compatible with all other stock components of the stock automobile without modification of the stock components.

14. The kit of claim 12, further comprising:
a pair of forward strut components having a forward strut geometry sized to be compatible with all other stock components, wherein the pair of forward strut components include at least additional forward strut customization; and
a sway bar component having a sway bar geometry sized to be compatible with all other stock components, wherein the sway bar component include at least additional sway bar customization.

15. The kit of claim 12, wherein the at least the additional control arm customization comprises:

an increased range of adjustability over the pair of stock control arm components; and an increased range of caster and camber alterations over the pair of stock control arm components.

16. The kit of claim 12, wherein the at least the additional spindle customization comprises:
a lowering of the stock automobile's center of gravity thereby improving aerodynamic characteristics, fuel economy, and handling over the pair of stock spindle components; and
a rotation of a brake caliper mount thereby allowing larger calipers over the pair of stock spindle components.

17. The kit of claim 12, wherein the pair of spindle components further comprise:
a pair of lower spindle ball joint adapters that allow a relocation of a lower control arm ball joint pivot point.

18. The kit of claim 12, wherein the pair of coil-over shock components each further include an adapter for matching placement of the pair of coil-over shock components with the pair of stock shock components.

19. The kit of claim 18, wherein the at least the additional shock customization comprises:
a removal of a stock torsion bar suspension thereby increasing an engine compartment space over the pair of stock shock components; and
an external adjustment of damping characteristic of the pair of coil-over shock components.

20. The kit of claim 13, wherein the at least additional disc brake customization comprises:
an increased brake rotor diameter over the pair of stock brake components; and
an increased cooling effect achieved by one of drilling, slotting, and venting each brake rotor of the pair of disc brake components.

* * * * *